Nov. 22, 1938.         F. HARTMANN         2,137,280
HIGH TEMPERATURE THERMOCOUPLE
Filed July 7, 1936
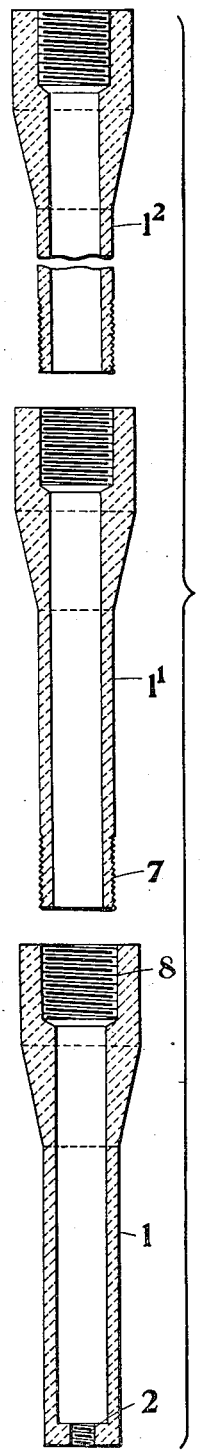
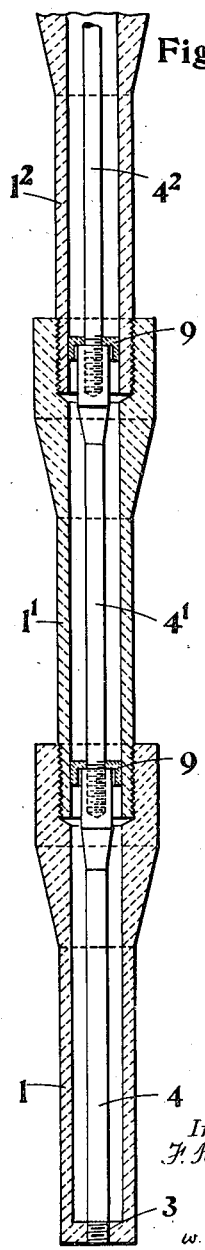

Patented Nov. 22, 1938

2,137,280

UNITED STATES PATENT OFFICE 2,137,280

HIGH TEMPERATURE THERMOCOUPLE

Fritz Hartmann, Dortmund, Germany

Application July 7, 1936, Serial No. 89,427
In Germany January 7, 1936

6 Claims. (Cl. 136—4)

Thermocouples are known that consist of carbon and silicon carbide which produce a very strong thermoelectric power when the position of contact of the carbon and silicon carbide is heated to high temperatures, the measurement of the electric current giving an indication of the temperature at the contacting position of the carbon and silicon carbide with reference to previous calibration by standard elements.

The invention is illustrated by way of example in the accompanying drawing, in which Figure 1 represents three separate sections of the outer part of the element that are adapted to be connected together in the manner hereinafter described.

Figure 2 represents three sections of separate rods that are adapted to be respectively inserted in the sections on the outer part represented in Figure 1 for building up the complete thermocouple.

Figure 3 illustrates annular ring 9 adapted for use as distance pieces.

Figure 4 represents the complete thermocouple, the sections of the outer part being shown in section.

As illustrated in the accompanying drawing the thermocouple according to the invention is provided as an outer carbon tube 1 which at the lower closed end is provided with a screw-threaded hole 2. Into the screw-threaded hole 2 fits the screw-threaded part 3 provided at one end of a rod 4 of silicon carbide, on the rod being brought into a concentric position within the tube 1. The rod 4 of silicon carbide is at the other end provided with a reinforcing socket 5 of the same material. The socket 5 may be separately formed and screwed on the stem of the rod or it may be integrally formed with the solid rod, the socket 5 being provided with an internal screw thread 6 corresponding to the external screw thread at the opposite end of the rod. Similar rods or rod units such as 4¹ and 4² made of silicon carbide may be screw-threaded into the respective internally screw-threaded sockets 5 until the required length of the thermocouple is obtained. The carbon tube 1 is similarly extended by the addition of further sections such as 1¹ and 1² of the carbon tube, the sections being connected together by the respective external or internal screw threads at 7 and 8.

Thus relatively short silicon carbide rod-sections and carbon tube-sections are adequate and they are less expensive to produce than long rods and tubes. The lower sections which contain the contact position and which must be placed into the melt or the like of which the temperature is to be measured, may be subject to rapid breaking down. The thermocouple according to the invention is not thereby rendered wholly useless, as in the case of thermocouples of the constructions usually employed, but only the lower sections, which can be readily replaced by new ones as they are interchangeably connected to the remaining parts of the thermocouple so that the unaffected parts can be again used. In order to prevent the silicon carbide rod and the carbon tube from touching except at the lower contacting position 2, 3, small rings 9 of refractory material (Figure 3) are inserted between the rod and tube as distance pieces for insulating the sections of rods of silicon carbide. The rings 9 may be of chamotte, sintered corundum, or similar ceramic substance that is a poor conductor of electricity at high temperatures. The insulating rings 9 rest upon the reinforcing sockets 5 and are advantageously of an angular form in transverse cross-section. The rings 9 should be provided so loosely that they easily slide on or slip off when the thermo-element is being assembled or taken to pieces.

Generally for measuring the temperature of metal and of slag melts it is preferable for the outer tube to be made of carbon (graphite). The outer tube may however be made of silicon carbide sections while the core may consist of carbon rod-sections which have been attached to each other in accordance with the directions hereinbefore described.

Such a thermocouple having the tubular sections of silicon carbide and sections of carbon rods will generally provide greater resistance to the attack of metal than one with an outside carbon tube which for example is readily dissolved by liquid steel and has also the injurious effect of carbonizing the bath.

With such a construction of thermocouple it is possible for example to measure the temperatures of steel melts up to 1700° C. at a cost of the thermo-elements needed that is not very high.

I claim:

1. A thermocouple for measuring the temperatures of highly heated melts, consisting of a series of unitary pairs of parts, each pair comprising an outer tube and a substantially co-extensive inner rod within the said outer tube, the said outer tube and the said inner rod forming respectively the elements of the thermocouple, one of the said parts being made of carbon and the other of silicon carbide, the outer tubes and the inner rods of adjacent pairs being adapted for connection together in alignment by their being externally and internally screw-threaded at their respective engaging ends.

2. A thermocouple for measuring the temperatures of highly heated melts as specified in claim 1, in which one unitary pair of parts has its inner rod held in axially immovable relation by connection of the end of the rod at the lower end of the outer tube at the contacting position while at the upper end the respective outer tube and inner rod are adapted for the connection in alignment therewith of another unitary pair.

3. A thermocouple for measuring the temperatures of highly heated melts as specified in claim 1, in which the respective parts of the unitary pairs are enlarged at their upper ends and in which an insulating ring of refractory material is applied upon the upper end of the inner rod to serve as a distance piece for preventing the inner rod from touching the outer tube.

4. A thermocouple for measuring the temperatures of highly heated melts, consisting of a series of unitary pairs of parts, each comprising an outer tube and a substantially co-extensive inner rod within the said outer tube, the said outer tube and the said inner rod forming respectively the elements of the thermocouple, one of the said parts being made of carbon and the other of silicon carbide, the upper ends of the respective outer tubes and inner rods being respectively enlarged for the formation of an internal screw thread adapted for the reception of the externally screw-threaded ends of the outer tube and the inner rod of the next adjacent unitary pair.

5. A thermocouple for measuring the temperatures of highly heated melts, consisting of a series of unitary pairs of parts, each comprising an outer tube and a substantially co-extensive inner rod within the said outer tube, the said outer tube and the said inner rod forming respectively the elements of the thermocouple, the said outer tube being made of carbon and the said inner rod being made of silicon carbide, the outer tubes and the inner rods of adjacent pairs being adapted for connection together in alignment by their being externally and internally screw-threaded at their respective engaging ends.

6. A thermocouple for measuring the temperatures of highly heated melts, consisting of a unitary pair of parts, comprising an outer tube and a substantially co-extensive inner rod within the said outer tube, the said outer tube and the said inner rod forming respectively the elements of the thermocouple, one of the said parts being made of carbon and the other of silicon carbide, the said outer tube and inner rod being connected together at one end in axially immovable relation to present a position of contact of the carbon and silicon carbide, while at the opposite end the respective parts are adapted for connection to another unitary pair of parts without contact between the said parts.

FRITZ HARTMANN.